(12) United States Patent
Tanaka et al.

(10) Patent No.: US 11,117,623 B2
(45) Date of Patent: Sep. 14, 2021

(54) VEHICLE PILLAR STRUCTURE

(71) Applicant: Toyota Jidosha Kabushiki Kaisha, Toyota (JP)

(72) Inventors: Ken Tanaka, Aichi-ken (JP); Yusuke Nishizaki, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 117 days.

(21) Appl. No.: 16/549,280

(22) Filed: Aug. 23, 2019

(65) Prior Publication Data

US 2020/0062312 A1 Feb. 27, 2020

(30) Foreign Application Priority Data

Aug. 27, 2018 (JP) .............................. JP2018-158739

(51) Int. Cl.
*B62D 25/04* (2006.01)
*B60R 13/02* (2006.01)
*B60R 21/213* (2011.01)
*B60J 10/84* (2016.01)
*B62D 21/15* (2006.01)

(52) U.S. Cl.
CPC ............ *B62D 25/04* (2013.01); *B60R 13/025* (2013.01); *B60R 21/213* (2013.01); *B62D 21/152* (2013.01); *B60J 10/84* (2016.02)

(58) Field of Classification Search
CPC .... B62D 25/04; B62D 21/152; B60R 13/025; B60R 21/213; B60R 2021/0435; B60J 10/84
See application file for complete search history.

(56) References Cited

U.S. PATENT DOCUMENTS

| 5,575,500 | A |   | 11/1996 | Mimura et al. |            |
|-----------|---|---|---------|---------------|------------|
| 5,709,407 | A | * | 1/1998  | Stephens      | B60R 13/025 |
|           |   |   |         |               | 280/751    |
| 6,079,732 | A | * | 6/2000  | Nakajima      | B60R 13/025 |
|           |   |   |         |               | 280/728.1  |
| 6,260,878 | B1| * | 7/2001  | Tanase        | B60R 21/213 |
|           |   |   |         |               | 280/730.2  |
| 6,293,581 | B1| * | 9/2001  | Saita         | B60R 21/213 |
|           |   |   |         |               | 280/730.2  |
| 6,315,350 | B1|   | 11/2001 | Nakane et al. |            |
| 6,333,515 | B1| * | 12/2001 | Kubota        | B60R 13/025 |
|           |   |   |         |               | 280/730.2  |

(Continued)

FOREIGN PATENT DOCUMENTS

| JP | H10217868 A  | 8/1998  |
|----|--------------|---------|
| JP | H11-321533 A | 11/1999 |

(Continued)

*Primary Examiner* — Gregory A Blankenship
(74) *Attorney, Agent, or Firm* — Dinsmore & Shohl LLP (57) ABSTRACT

A vehicle pillar structure is provided including a pillar frame that configures framework of a pillar and that includes a flange portion configuring an attachment counterpart for a weather strip at a vehicle front-rear direction rear end portion of the pillar frame, a garnish that is attached to a vehicle width direction inner side of the pillar frame and that configures a styling face of a vehicle cabin interior, and plural ribs that are integrally formed to a face of the garnish on the pillar frame side, that are supported by the flange portion through the weather strip, and that are arrayed in a pillar length direction.

6 Claims, 7 Drawing Sheets

(56) References Cited

U.S. PATENT DOCUMENTS

| | | | |
|---|---|---|---|
| 6,719,321 B2* | 4/2004 | Yasuhara | B60R 21/04 280/730.2 |
| 2005/0029780 A1* | 2/2005 | Tanase | B60R 21/213 280/730.2 |
| 2005/0116447 A1* | 6/2005 | Ryu | B60R 21/213 280/728.2 |
| 2008/0197609 A1* | 8/2008 | Jaramillo | B60R 21/213 280/730.2 |
| 2008/0197610 A1* | 8/2008 | Downey | B60R 13/0206 280/730.2 |
| 2008/0296933 A1 | 12/2008 | Kamiya et al. | |
| 2010/0001496 A1* | 1/2010 | Schirm | B60R 21/213 280/730.2 |
| 2014/0312600 A1* | 10/2014 | Verner | B60N 3/026 280/728.2 |
| 2015/0191140 A1* | 7/2015 | Sugie | B60R 21/04 280/748 |
| 2016/0068115 A1 | 3/2016 | Inagawa et al. | |
| 2016/0368447 A1* | 12/2016 | Sakurai | B60R 13/0206 |
| 2017/0240210 A1* | 8/2017 | Terada | B62D 25/04 |
| 2018/0134248 A1* | 5/2018 | Villacres Mesias | B60R 13/025 |
| 2020/0062312 A1* | 2/2020 | Tanaka | B62D 21/152 |
| 2020/0156584 A1* | 5/2020 | Akagi | B60R 21/215 |
| 2020/0238924 A1* | 7/2020 | Sakuma | B60R 13/025 |

FOREIGN PATENT DOCUMENTS

| | | |
|---|---|---|
| JP | 2012153196 A | 8/2012 |
| JP | 2012-240583 A | 12/2012 |
| JP | 2016052856 A | 4/2016 |
| WO | 9819893 A1 | 5/1998 |

* cited by examiner

VEHICLE PILLAR STRUCTURE

CROSS-REFERENCE TO RELATED APPLICATION

This application is based on and claims priority under 35 USC 119 from Japanese Patent Application No. 2018-158739 filed on Aug. 27, 2018, the disclosure of which is incorporated by reference herein.

BACKGROUND

Technical Field

The present disclosure relates to a vehicle pillar structure.

Related Art

Japanese Patent Application Laid-Open No. H10-217868 discloses a configuration in which a front pillar includes an inner pillar panel, a garnish that envelops the inner pillar panel from a cabin inner side, and ribs that are disposed between the garnish and the inner pillar panel and are integrally formed to the garnish.

In this related art, the size of the ribs integrally formed to the garnish corresponds to a cross-section profile of the garnish, and the ribs are disposed so as to fill a space between the inner pillar panel and the garnish. When an occupant hits the garnish, the ribs deform so as to absorb the impact energy, thereby protecting the occupant.

However, in the ribs according to this related art, the size of the ribs is a size corresponding to the cross-section profile of the garnish, and the ribs obtain a reaction force from a side face of the inner pillar panel accompanying deformation of the garnish when an occupant hits the garnish. The overall width of the front pillar is thereby increased by the ribs, and there is a concern that the field of view of an occupant in a cabin (vehicle cabin) might be affected as a result.

SUMMARY

In consideration of the above circumstances, the present disclosure is to obtain a vehicle pillar structure capable of protecting an occupant when the occupant hits a pillar from a vehicle cabin inner side in a vehicle collision, and of securing a good field of view of an occupant inside the vehicle cabin.

A vehicle pillar structure according to a first aspect of the present disclosure includes a pillar frame that includes a flange portion configuring an attachment counterpart for a weather strip at a rear end portion, in a vehicle front-rear direction, of the pillar frame, a garnish that is attached to an inner side, in a vehicle width direction, of the pillar frame and that configures a styling face of a vehicle cabin interior, and a plurality of ribs that are integrally formed at a face of the garnish at a side of the pillar frame, that are supported by the flange portion via the weather strip, and that are arrayed along a pillar length direction.

In the vehicle pillar structure according to the first aspect of the present disclosure, the plurality of ribs are integrally formed to the pillar frame-side face of the garnish configuring a styling face of the vehicle cabin interior. The plurality of ribs are supported through the weather strip by the flange portion provided at the vehicle from-rear direction rear end portion of the pillar frame, and are arrayed in the pillar length direction. Thus, when an occupant bits the pillar from the vehicle cabin inner side, the ribs are able to swiftly obtain a reaction force from the flange portion of the pillar frame accompanying deformation of the garnish. Impact energy is then absorbed by crushing of the ribs, so as to realize occupant protection performance by the garnish.

Furthermore, the structure is configured such that the ribs absorb impact energy by obtaining a reaction force from the flange portion of the pillar frame. An increase in the size of the ribs is therefore suppressed in comparison to, for example, cases in which a structure is formed in which ribs obtain a reaction force from a vehicle width direction inner face of the pillar frame. This contributes to a reduction in the size of the vehicle pillar. The occupant is thereby protected on hitting the pillar from the vehicle cabin inner side, and a good field of view is secured for the occupant inside the vehicle cabin.

A vehicle pillar structure according to a second aspect of the present disclosure is the vehicle pillar structure of the first aspect, wherein an array density of the plurality of ribs on the garnish in the pillar length direction is higher in a predetermined height region of the garnish than in other regions of the garnish.

In the vehicle pillar structure according to the second aspect of the present disclosure, for example, the predetermined region can be set to a region of the garnish that the head of the occupant has a higher likelihood of hitting in a vehicle collision. In such cases, arraying more ribs in this region than in other regions enables impact energy to be efficiently absorbed while suppressing an unnecessary increase in the weight of the garnish.

A vehicle pillar structure according to a third aspect of the present disclosure is the vehicle pillar structures of the first aspect or the second aspect, wherein each of the plurality of ribs is provided with an inclined portion, the inclined portion abutting an airbag module that is disposed at, a vehicle front side of the plurality of ribs and that includes an airbag configured to be inflated and deployed from between the vehicle front-rear direction rear end portion of the pillar frame and the garnish.

In the vehicle pillar structure according to the third aspect of the present disclosure, the inclined portion that abuts the airbag module is provided to each of the ribs. Thus, load input to the garnish when the airbag inflates and deploys is swiftly transmitted through the inclined portion. This enables the vehicle front-rear direction rear end portion of the pillar frame and the garnish to be pushed apart from each other at an early stage, enabling the airbag to inflate and deploy swiftly. Thus, protection performance of an occupant when the occupant hits the pillar from the vehicle cabin inner side is further improved.

A vehicle pillar structure according to a fourth aspect of the present disclosure is the vehicle pillar structure of the third aspect, wherein front end, in the vehicle front-rear direction portion, of the inclined portion abutting the airbag module, is formed in a convex face shape protruding toward the vehicle front side as viewed along the pillar length direction.

In the vehicle pillar structure according to the fourth aspect of the present disclosure, the vehicle front-rear direction front end portion of the inclined portion is formed in a convex face shape protruding toward the vehicle front side as viewed along the pillar length direction. Load input to the garnish from the airbag is thus even more swiftly transmitted than, for example, cases in which a vehicle front-rear direction front end portion of the inclined portion is formed in a linear shape. Moreover, the airbag is suppressed from catching on the ribs, enabling the airbag to be inflated and deployed as intended.

A vehicle pillar structure according to a fifth aspect of the present disclosure is the vehicle pillar structure of the third aspect or the fourth aspect, wherein a thinned portion, at which, a plate thickness direction thickness of the garnish is thinner than at other locations, is formed at a boundary portion between an inner end portion, in a vehicle width direction, of the inclined portion and the garnish.

In the vehicle pillar structure according to the fifth aspect of the present disclosure, the thinned portion where the plate thickness direction thickness of the garnish is set thinner than at other locations is formed at the boundary portion between the vehicle width direction inner end portion of the inclined portion and the garnish. Thus, during inflation and deployment of the airbag, the vehicle front-rear direction rear end portion of the garnish undergoes folding deformation in a direction away from the pillar frame originating at the thinned portion under load input from the airbag. This suppresses any impairment to inflation and deployment of the airbag by the garnish, enabling the airbag, to be inflated and deployed as intended.

Due to the configuration described above, the vehicle pillar structure of the first aspect of the present disclosure exhibits the effects of protecting an occupant when the occupant hits the pillar from the vehicle cabin inner side in a vehicle collision, and of securing a good field of view for an occupant inside the vehicle cabin.

Due to the configuration described above, the vehicle pillar structure of the second aspect of the present disclosure exhibits the effects of enabling impact energy to be efficiently absorbed by the ribs that are integrally formed to the garnish, while enabling an unnecessary increase in the weight of the garnish to be suppressed.

Due to the configuration described above, the vehicle pillar structure of the third aspect of the present disclosure exhibits the effect of swiftly inflating and deploying the airbag, thereby enabling protection performance of an occupant when the occupant hits the pillar from the chicle cabin inner side to be further improved.

Due to the configuration described above, the vehicle pillar structure of the fourth aspect of the present disclosure exhibits the effect of transmitting load input to the garnish from the airbag still more swiftly, and suppressing the airbag from catching on the ribs, thereby enabling the airbag to inflated and deployed as intended.

Due to the configuration described above, the vehicle pillar structure of the fifth aspect of the present disclosure exhibits the effect of suppressing any impairment to inflation and deployment of the airbag by the garnish, thereby enabling the airbag to be inflated and deployed as intended.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a vehicle pillar structure according to a first exemplary embodiment of the present disclosure, with reference to FIG. 1 to FIG. 5B. Note that the arrow FR indicates a vehicle front-rear direction front side, the arrow OUT indicates a vehicle width direction outer side, and the arrow UP indicates a vehicle vertical direction upper side. In the below explanation, unless specifically stated otherwise, reference to up and down, front and rear, and left and right directions refers to up and down in the vehicle vertical direction front and rear in the vehicle front-rear direction, and left and right in the vehicle left-right direction (vehicle width direction). Some reference numerals may be omitted from the drawings in order to facilitate viewing of the drawings.

Figure 2:
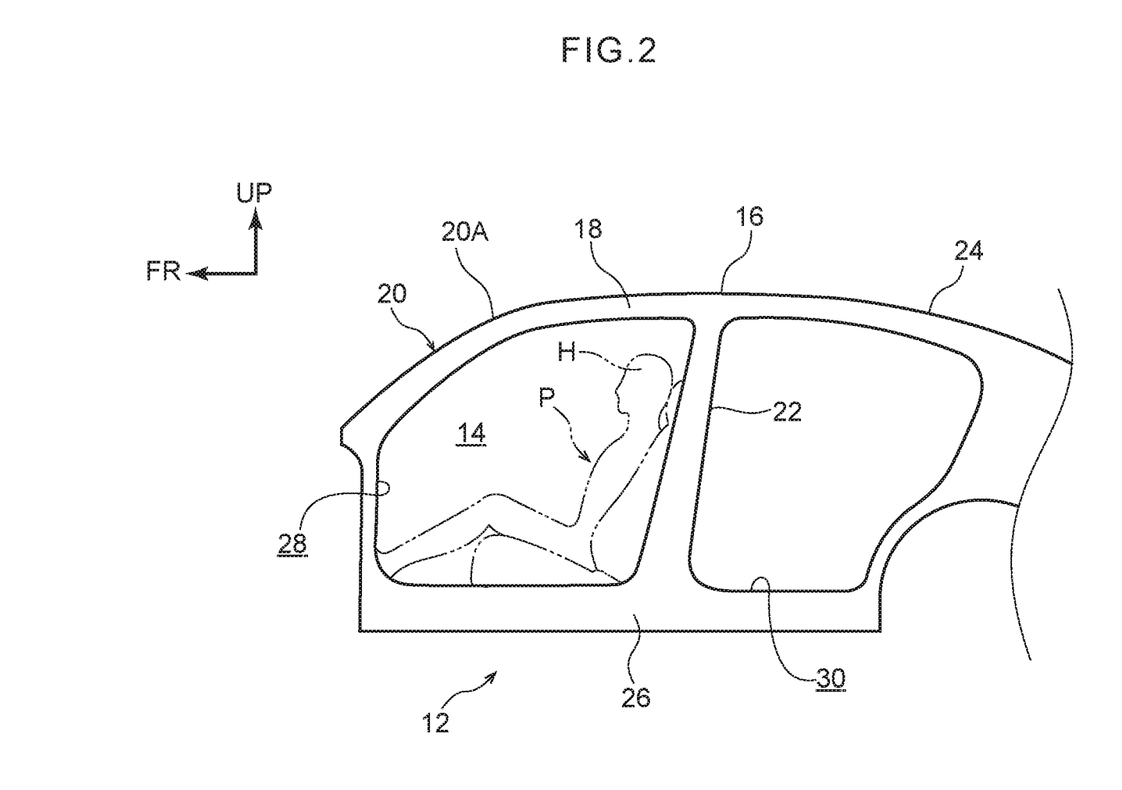
FIG. 2 is a side view illustrating a side face of a vehicle applied with the vehicle pillar structure illustrated in FIG. 1.
Figure 3A:
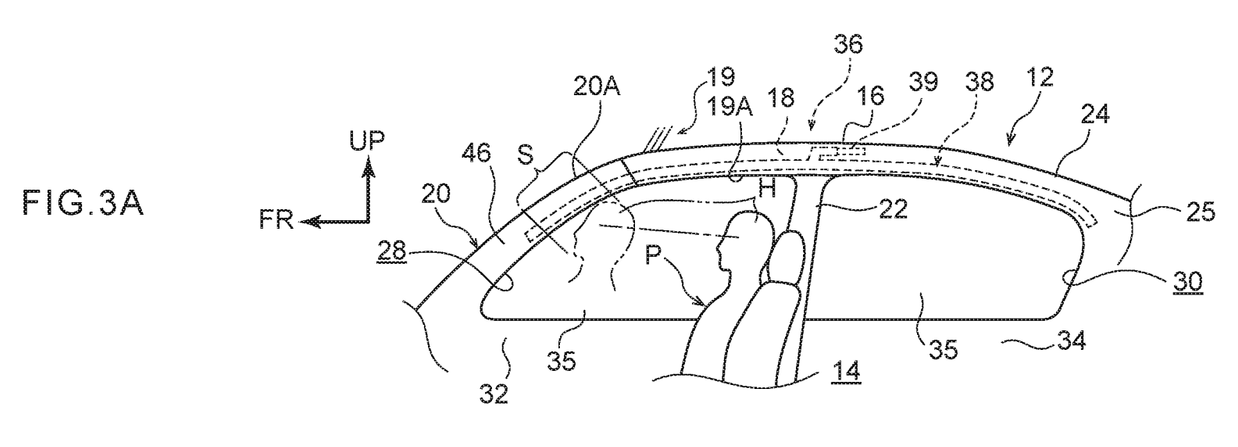
FIG. 3A is a side view of the vehicle illustrated in FIG. 2, illustrating a state prior to a curtain airbag being actuated as viewed from a vehicle cabin inner side.
Figure 3B:
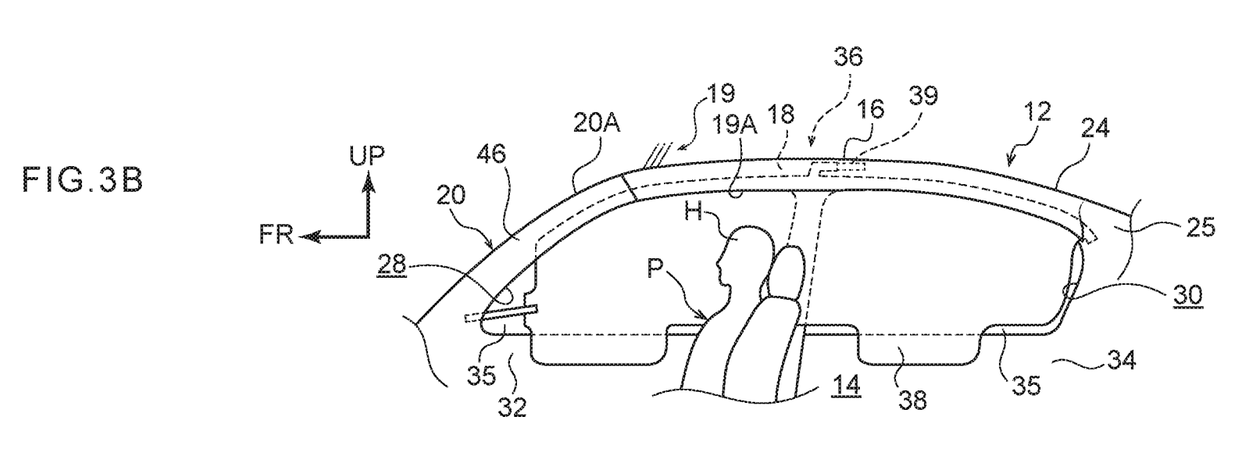
FIG. 3B is a diagram corresponding to FIG. 3A, illustrating a state after a curtain airbag has been actuated.

As illustrated in FIG. 2 and FIG. 3A, a vehicle 12 applied with the vehicle pillar structure of the present exemplary embodiment includes a roof 16 forming a ceiling of a cabin 14. The vehicle 12 also includes roof side rails 18 that extend along the vehicle front-rear direction and are disposed at vehicle width direction outer end portions of the roof 16. The vehicle 12 also includes front pillars 20, center pillars 22, and rear pillars 24, each of which extends in the vehicle vertical direction and has an upper end portion connected to the corresponding roof side rail 18 so as to support the roof 16, The vehicle 12 also includes rockers 26, each of which extends along the vehicle front-rear direction and is connected to lower end portions of the corresponding front pillar 20, center pillar 22, and rear pillar 24. The roof side rails 18, the front pillars 20, the center pillars 22, the rear pillars 24, and the rockers 26 function as framework members of a vehicle body, and form openings 28 and openings 30 that lie in the vehicle front-rear direction and are used for vehicle entry and exit. The openings 28 and the openings 30 are closed off by front side doors 32 and rear side doors 34, and the front side doors 32 and the rear side doors 34 partition the cabin 14 from the vehicle exterior. Note that the front side doors 32 and the rear side doors 34 are omitted from illustration in FIG. 2.

Note that the occupant P illustrated in FIG. 1 to FIG. 3B is for example a dummy of an AM50 (an American adult male in the $50^{th}$ percentile).

As illustrated in FIG. 3A, an elongated airbag module 36 is installed along each of the roof side rails 18 in the cabin 14. The airbag module 36 is configured including, a circular column shaped inflator 39 that ejects gas in a side-on collision of the vehicle, and a curtain airbag 38 (also simply referred to as "airbag 38" below) that inflates and deploys on being supplied with gas from the inflator 39.

In a state prior to inflation and deployment of the airbag 38, the airbag module 36 is assembled as a long and thin elongated member in which the airbag 38 is folded up. In this state, an intermediate portion of the airbag module 36 is stowed in a space between the corresponding roof side rail 18 and a vehicle width direction outer side end portion 19A of a roof headliner 19 configuring a lining of the roof 16. A front end portion of the airbag module 36 is stowed in a space between a pillar frame 42, described later, of the corresponding front pillar 20, and a pillar garnish 46 installed at the vehicle cabin inner side of the pillar frame 42. A rear end portion of the airbag module 36 is stowed in a space between a non-illustrated pillar frame of the corresponding rear pillar 24, and a pillar garnish 25 installed at the vehicle cabin inner side of the non-illustrated pillar frame.

In the airbag module 36 with the above configuration, the airbag 38 inflates when the inflator 39 is actuated and gas is supplied into the airbag 38. The vehicle width direction outer side end portion 19A of the roof headliner 19 is thereby pushed open toward the vehicle cabin inner side, and a rear end portion of the pillar garnish 46 of the front pillar 20 and a front end portion of the pillar garnish 25 of the rear pillar 24 are also pushed open. The airbag 38 is thereby inflated and deployed so as to substantially cover both a front seat side window 35 of the front side door 32 and a rear seat side window 35 of the rear side door 34 from the vehicle cabin inner side (see FIG. 3B).

To explain further, FIG. 3A illustrates a head protection region S at the front pillar 20. The head protection region S is a region where the head H of the occupant P has a high likelihood of contacting the front pillar 20 when moving under inertia toward the vehicle front side and vehicle width direction outer side (the arrow K direction in FIG. 1) in an oblique collision to a front section of the vehicle 12, in the present exemplary embodiment, the head protection region S substantially matches a region corresponding to a length direction upper half of the from pillar 20. Note that a region of the pillar garnish 46 matching the head protection region S corresponds to a "predetermined height region" of the present disclosure.

Explanation follows regarding the front pillar 20, this being a relevant portion of the present exemplary embodiment.

An instrument panel (not illustrated in the drawings) configuring a vehicle interior component is installed at a front end portion of the cabin 14. Bar shaped instrument panel reinforcement, not illustrated in the drawings, is installed with its length direction along the vehicle width direction inside the instrument panel. The left and right pair of front pillars 20 are installed at two length direction end portions of the instrument panel reinforcement. Each of the front pillars 20 is configured by a lower portion to which the corresponding length direction end portion of the instrument panel reinforcement is joined, and an upper portion 20A that extends obliquely toward the vehicle rear side and upper side from the lower portion. The two vehicle width direction side edges of a windshield glass 40 are supported by the left and right pair of upper portions 20A.

Figure 1:
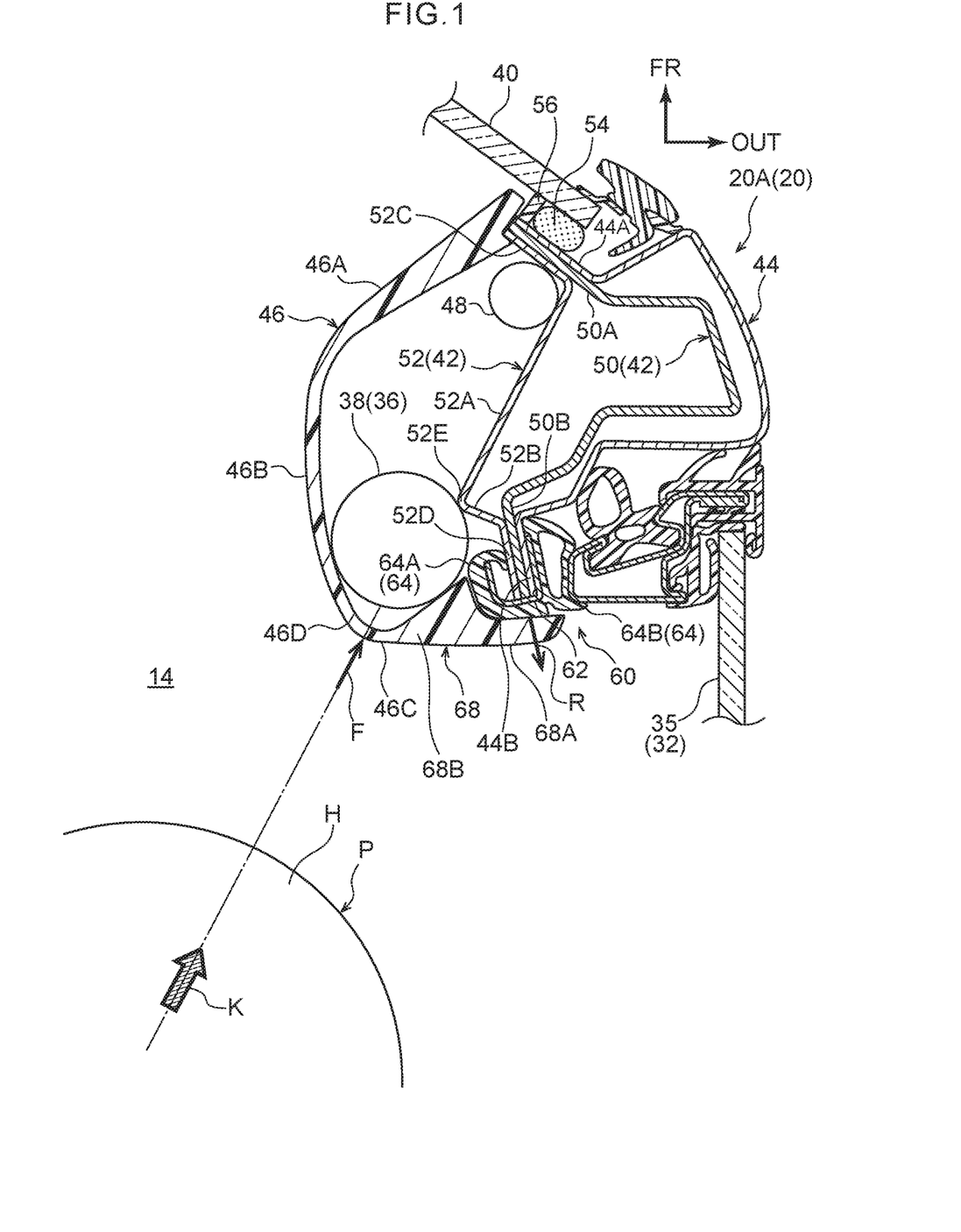
FIG. 1 is a cross-section illustrating a front pillar applied with a vehicle pillar structure according to a first exemplary embodiment.

FIG. 1 is a cross-section of the front pillar 20 disposed on the vehicle width direction right side of the vehicle 12, in a state sectioned along a direction substantially perpendicular to the length direction of the front pillar 20. Note that the front pillar 20 disposed on the vehicle width direction left side of the vehicle 12 has the same cross-section structure as the front pillar 20 disposed on the vehicle width direction right side. The following explanation accordingly focuses on only the front pillar 20 disposed on the vehicle width direction right side, and explanation regarding the front pillar 20 disposed on the vehicle width direction left side is omitted.

As illustrated in FIG. 1, the front pillar 20 includes the pillar frame 42 with a hollow closed cross-section structure, serving as a vehicle body framework member disposed at a substantially central portion of the front pillar 20, and a side panel outer 44 disposed at the vehicle width direction outer side of the pillar frame 42 and configuring part of the external styling of the vehicle 12. At the vehicle cabin inner side of the pillar frame 42, the front pillar garnish 46 (simply referred to below as "garnish 46"), serving as a vehicle interior member, is provided as a lining using a fixing method such as resin clips, not illustrated in the drawings.

Wiring 48 and the front end portion of the above-described airbag, module 36 are disposed between the garnish 46 and the pillar frame 42. In other words, the wiring 48 and the airbag module 36 are hidden from the view of an occupant seated in the cabin 14 by the garnish 46. Explanation follows regarding the pillar frame 42, the side panel outer 44, and the garnish 46 configuring the front pillar 20, in this sequence.

The pillar frame 42 of the front pillar 20 includes a pillar outer panel 50 extending along the vehicle vertical direction and disposed at the vehicle width direction outer side, and a pillar inner panel 52 extending along the vehicle vertical direction and disposed at the vehicle width direction inner side. Note that in the below explanation, the pillar outer panel 50 is sometimes simply referred to as "outer panel 50", and the pillar inner panel 52 is sometimes simply referred to as "inner panel 52". In the present exemplary embodiment, the outer panel 50 and the inner panel 52 are each formed by pressing a sheet steel material.

The outer panel 50 has a substantially hat shaped cross-section profile open toward the vehicle width direction inner side. A front outer flange 50A and rear outer flange 50B are respectively provided at two vehicle front-rear direction end portions of the outer panel 50. The front outer flange 50A extends toward the vehicle width direction inner side and slightly toward the front side, and is disposed substantially parallel to a vehicle width direction right end portion of the windshield glass 40. The rear outer flange 50B extends substantially toward the vehicle front-rear direction rear side, and is disposed substantially parallel to the side window 35 of the front side door 32 disposed on the right side of the vehicle 12. The extension direction of the rear outer flange 50B is a different direction to the direction of progress of the head H of the occupant P in an oblique collision, as illustrated by the arrow K in FIG. 1.

The inner panel 52 has a substantially L-shaped cross-section profile open toward the vehicle width direction outer side. Specifically, the inner panel 52 includes a lengthwise wall 52A with a rear end side inclined toward the vehicle width direction inner side with respect to the vehicle front-rear direction, and a lateral wall 52B extending toward the vehicle width direction outer side from a rear end portion of the lengthwise wall 52A. A front inner flange 52C and a rear inner flange 52D are respectively provided at two vehicle front-rear direction end portions of the inner panel 52. The front inner flange 52C corresponds to the front outer flange 50A, and the rear inner flange 52D corresponds to the rear outer flange 50B of the above-described outer panel 50. The front outer flange 50A and the front inner flange 52C, and the rear outer flange 50B and the rear inner flange 52D, are respectively joined together by welding or the like at the two front-rear direction end portions of both the outer panel 50 and the inner panel 52. The pillar frame 42 is thereby formed with a closed cross-section by the outer panel 50 and the inner panel 52.

The side panel outer 44 is formed by pressing a sheet steel material. The side panel outer 44 is disposed so as to cover the outer panel 50 from the vehicle outer side, and has a substantially hat shaped cross-section profile open toward the vehicle width direction inner side. A front flange 44A that is joined to the front outer flange 50A of the outer panel 50 is provided at a vehicle front-rear direction front end portion of the side panel outer 44. The vehicle width direction right end portion of the windshield glass 40 is disposed at the vehicle front side of the front flange 44A, and the front flange 44A and the windshield glass 40 are joined together using an adhesive 54. A rubber seal 56 is provided at the vehicle width direction inner side of the adhesive 54 so as to seal a gap present between the windshield glass 40 and the front flange 44A.

A rear flange 44B that is joined to the rear outer flange 50B of the outer panel 50 is provided at a vehicle front-rear direction rear end portion of the side panel outer 44. As illustrated in FIG. 1, in sequence from the vehicle width direction inner side toward the vehicle width direction outer side, the rear inner flange 52D, the rear outer flange 50B, and the rear flange 44B are overlapped and joined together at a rear end portion of the pillar frame 42. The rear end portion of the pillar frame 42 serves as an attachment counterpart for a weather strip 60. Note that the rear inner flange 52D and the rear outer flange 50B correspond to a "flange portion" of the present disclosure.

The weather strip 60 is curved in a substantially U shape in a cross-section view of the front pillar 20, and includes a substantially U-shaped metal retaining fastener 62 that clamps onto the rear inner flange 52D, the rear outer flange 50B, and the rear flange 44B. The weather strip 60 also includes a rubber seal 64 that is fixed to the retaining fastener 62 so as to be disposed covering an outer face of the retaining fastener 62. The vehicle width direction inner side of the seal 64 configures a retaining portion 64A that is formed in a substantially U shape in cross-section view of the front pillar 20 and covers the outer face of the retaining fastener 62. The vehicle width direction inner side of the retaining portion 64A abuts the rear end portion of the garnish 46, described below. A tubular portion 64B formed in a circular tube shape in cross-section view is integrally formed to the vehicle width direction outer side of the retaining, portion 64A. The tubular portion 64B seals between a front end portion of the corresponding front side door 32 and the front pillar 20 in a closed state of the front side door 32. Note that the retaining fastener 62 may be insert molded in the retaining portion 64A.

The garnish 46 is an interior component formed using a resin material, and is provided so as to cover the pillar frame 42 from the cabin 14 side. In cross-section view of the front pillar 20, the garnish 46 is formed in a substantially U shape including a portion open toward the vehicle width direction outer side so as to protrude toward the vehicle width direction inner side. Specifically, the garnish 46 includes a front wall 46A extending toward the vehicle width direction inner side and rear side, an inner wall 46B extending from a rear end portion of the front wall 46A toward the vehicle rear side and slightly toward the vehicle outer side, and a rear wall 46C extending from a rear end portion of the inner wall 46B toward the vehicle width direction outer side. Note that the extension direction of the rear wall 46C is a direction that is substantially orthogonal to the extension direction of the rear inner flange 52D, the rear outer flange 50B, and the rear flange 44B disposed at the rear end portion of the pillar frame 42.

Figure 4:
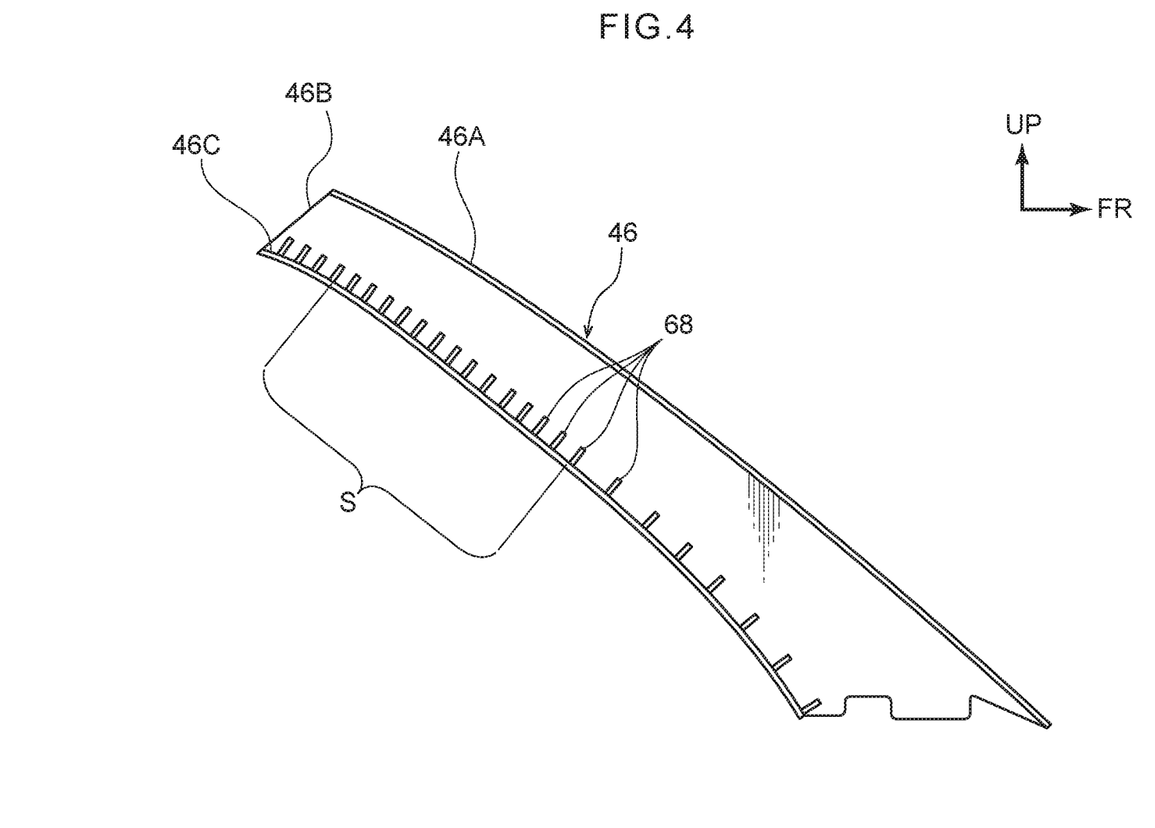
FIG. 4 is a schematic side view of the garnish of the front pillar illustrated in FIG. 1.

As illustrated in FIG. 1 and FIG. 4, plurality of ribs 68 are integrally formed to the rear well 46C so as to be interposed between the rear wall 46C and the pillar frame 42. The plurality of ribs 68 are arrayed in the length direction of the front pillar 20. An array density of the ribs 68 in the pillar length direction on the garnish 46 is set higher in a length direction upper half region of the garnish 46 including the head protection region S than in other regions (a lower half region).

The ribs 68 project toward the vehicle front side in a direction substantially perpendicular to the rear wall 46C. An engaging portion 68A disposed facing the retaining portion 64A of the above-described weather strip 60 is provided at a vehicle width direction inner end portion of each of the ribs 68. The engaging portion 68A is configured as a substantially L-shaped notch open toward the vehicle width direction outer side and front side in cross-section view of the front pillar 20. A substantially triangular shaped inclined portion 68B that protrudes toward the vehicle front side in cross-section view of the front pillar 20 is provided at the vehicle width direction inner side of the engaging portion 68A.

As illustrated in FIG. 1, the retaining portion 64A of the seal 64 engages with the engaging portions 68A of the ribs 68. The ribs 68 are thereby supported by the rear end portion of the pillar frame 42 through the weather strip 60. A front end portion of each of the inclined portions 68B is inclined in a linear shape toward the oblique rear on progression from the vehicle width direction outer side toward the vehicle width direction inner side. The front end portion of the inclined portion 68B abuts the front end portion of the airbag module 36 disposed at the front side of the ribs 68. Note that in this state, the airbag module 36 is stowed in a space between a bend 52E located between the lengthwise wall 52A and the lateral wall 52B configuring the inner panel 52, and a corner portion 46D, located between the inner wall 46B and the rear wall 46C configuring the garnish 46.

Explanation follows regarding a deformation mode of the ribs 68 when the head H of the occupant P hits the garnish 46.

As illustrated in FIG. 1, in an oblique collision of the vehicle in which the vehicle 12 collides with a barrier (not illustrated in the drawings) on the oblique front-right, the head H of the occupant P moves under inertia toward the vehicle front and vehicle width direction right side, and hits the garnish 46 near to the corner portion 46D. A collision load F along the direction of progression of the head of the occupant P is input to the garnish 46 when this occurs (see the arrow F in FIG. 1).

Accompanying deformation of the garnish 46 toward the pillar frame 42 due to this collision load, the engaging portions 68A of the ribs 68 are pressed against the rear inner flange 52D, the rear outer flange 50B, and the rear flange 44B through the weather strip 60. The ribs 68 are accordingly well-supported due to obtaining a reaction force (see the arrow R in FIG. 1) from the rear end portion of the pillar frame 42, thereby enabling load to be effectively transmitted to the inclined portions 68B of the ribs 68. Impact energy is then absorbed by crushing of the inclined portions 68B. This prevents reaction force from the pillar frame 42 from being directly borne by the head H of the occupant P, enabling the burden on the head H to be alleviated.

Figure 5A:
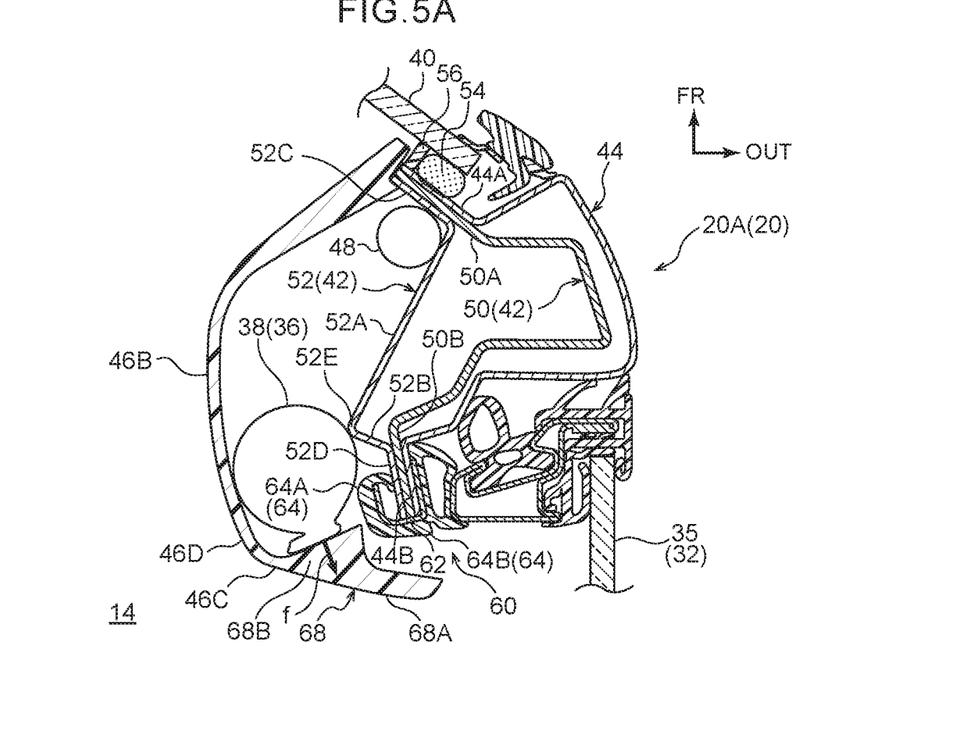
FIG. 5A is a cross-section corresponding to FIG. 1, illustrating a state shortly after inflation and deployment of an airbag has started.
Figure 5B:
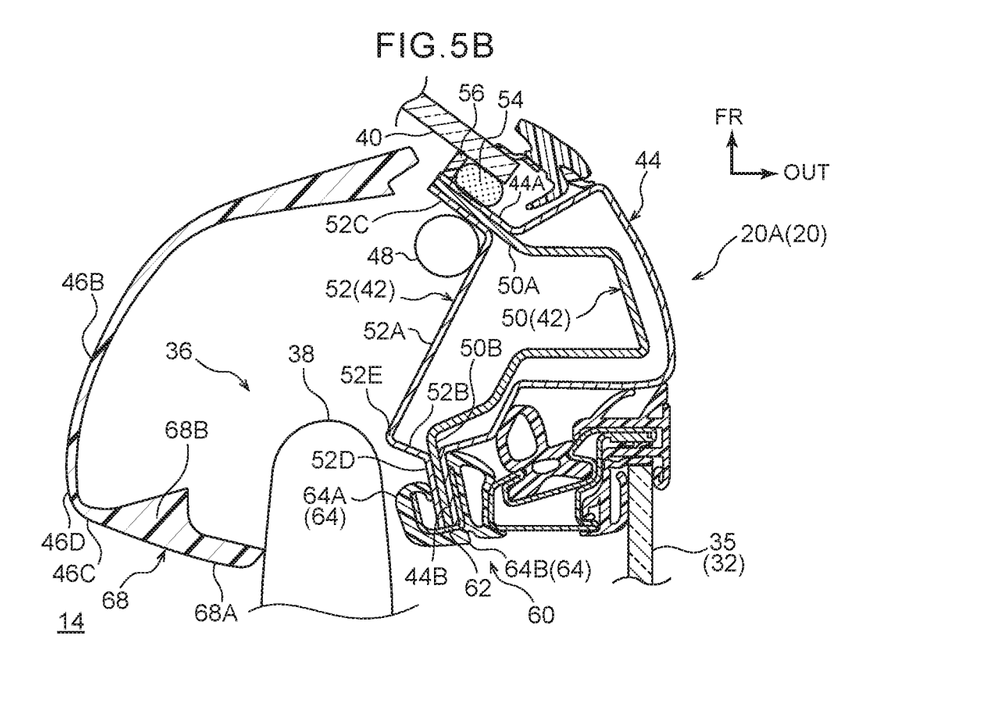
FIG. 5B is a cross-section corresponding to FIG. 1, illustrating a state after inflation and deployment of an airbag has completed.

Explanation follows regarding a deformation mode of the garnish 46 when the airbag 38 configuring the airbag module 36 inflates and deploys in a side-on collision of the vehicle 12.

As illustrated in FIG. 5A, when gas is supplied into the airbag 38 from the inflator 39, a front end portion of the airbag 38 inflates between the garnish 46 and the pillar frame 42. When this occurs, a pressing force f (see FIG. 5A) from the inside acts swiftly on the inclined portions 68B of the ribs 68 disposed abutting the airbag module, such that a join between the rear end portion of the garnish 46 and the weather strip 60 is split open at an early stage. This enables the front end portion of the airbag 38 to inflate and deploy swiftly toward the lower side of the front pillar 20.

Operation and Effects of Present Exemplary Embodiment

Explanation follows regarding operation and effects of the present exemplary embodiment.

In the vehicle pillar structure according to the present exemplary embodiment described above, the plurality of ribs 68 are integrally formed to the face on the pillar frame 42 side of the garnish 46 that configures a styling face inside the cabin 14. The plurality of ribs 68 are arrayed in the length direction of the front pillar 20. Each of the ribs 68 is supported through the weather strip 60 by the rear inner flange 52D and the rear outer flange 50B provided at the vehicle front-rear direction rear end portion of the pillar frame 42. Thus, when the occupant P hits the front pillar 20 from the cabin 14 side, the ribs 68 are able to swiftly obtain a reaction force from the rear inner flange 52D and the rear outer flange SOB of the pillar frame 42 accompanying deformation of the garnish 46. Impact energy is then absorbed by crushing of the ribs 68, so as to realize protection performance of the occupant P by the garnish 46.

Furthermore, the structure is configured such that the ribs 68 absorb impact energy by obtaining a reaction force from the rear inner flange 52D and the rear outer flange 50B of the pillar frame 42. An increase in the size of the ribs 68 is therefore suppressed in comparison to, for example, cases in which a structure is formed in which ribs obtain a reaction force from a vehicle width direction inner face (the lengthwise wall 52A) of the pillar frame 42 of the present exemplary embodiment. This contributes to a reduction in the size of the front pillar 20, enables the occupant P to be protected on hitting the garnish 46 from the cabin 14 side, and enables a good field of view for the occupant P inside the cabin 14.

Since a contribution can be made to reducing the size of the ribs 68 as described above, design constraints on the front pillar 20 can be suppressed, even in configurations in which the airbag 38 and the wiring 48 are disposed between the pillar frame 42 and the garnish 46.

Moreover, in the present exemplary embodiment, the array density of the ribs 68 in the pillar length direction of the garnish 46 is set higher in the length direction upper half region of the garnish 46 than in other regions (the lower half region). Note that the upper half region substantially matches the head protection region S of the garnish 46, and so the ribs 68 are more densely arrayed in a region which the head H of the occupant P has a high likelihood of hitting in a vehicle collision. This enables impact energy to be efficiently absorbed by the garnish 46, and enables the head H of the occupant P to be protected, when the head H hits the garnish 46. Moreover, the efficient arrangement of the ribs 68 enables an unnecessary increase in the weight of the garnish 46 due to the ribs 68 to be suppressed.

In the state prior to inflation and deployment of the airbag 38, the inclined portions 68B of the ribs 68 are provided abutting the airbag module 36. Thus, load input to the garnish 46 when the airbag 38 inflates and deploys is swiftly transmitted through the inclined portions 68B. This enables the vehicle front-rear direction rear end portion of the pillar frame 42 and the garnish 46 to be pushed apart from each other at an early stage, enabling the airbag 38 to inflate and deploy swiftly. The pillar structure of the present exemplary embodiment thereby enables the protection performance of the occupant P on hitting the front pillar 20 from the cabin 14 side to be further improved.

Moreover, in the present exemplary embodiment, the extension direction of the rear inner flange 52D and the rear outer flange 50B disposed at the rear end portion of the pillar frame 42 is a different direction to the direction of progress of the head H of the occupant P in an oblique collision, illustrated by the arrow K in FIG. 1. This enables the head H of the occupant P to be suppressed from hitting the pillar frame 42 along a high rigidity direction of the rear inner flange 52D and the rear outer flange 50B in an oblique collision to the front section of the vehicle. This enables the protection performance of the head of the occupant P by the front pillar 20 to be improved in comparison to for example cases in which the extension direction of the rear inner flange 52D and the rear outer flange 50B is aligned with the direction of progress of the head H of the occupant P in an oblique collision.

Second Exemplary Embodiment

Figure 6:
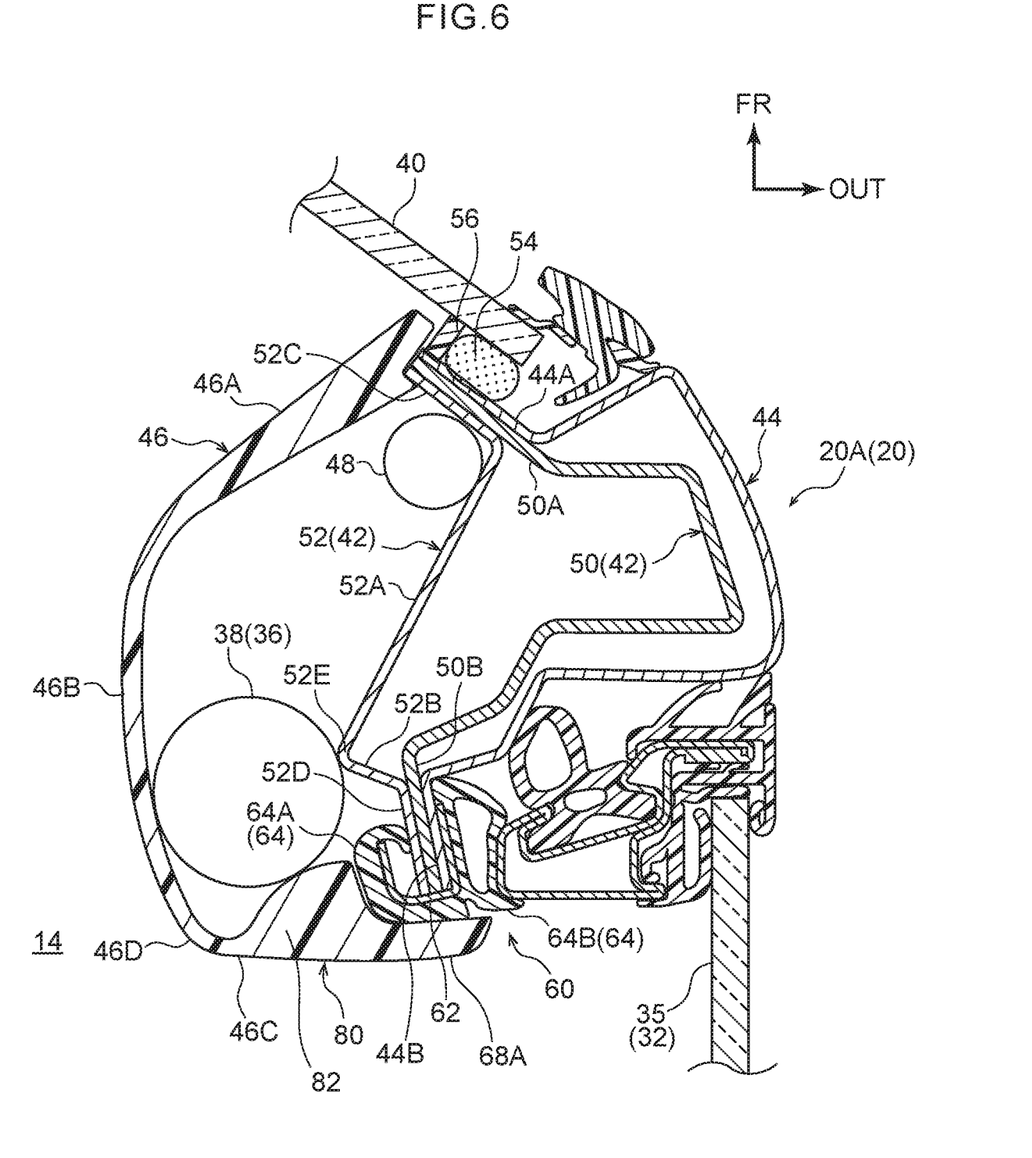
FIG. 6 is a cross-section corresponding to FIG. 1, illustrating a front pillar applied with a vehicle pillar structure according to a second exemplary embodiment.

Explanation follows regarding a vehicle pillar structure according to a second exemplary embodiment of the present disclosure, with reference to FIG. 6. Note that the same reference numerals are appended to members that are the same as those in the first exemplary embodiment, and explanation thereof is omitted.

As illustrated in FIG. 6, in the vehicle pillar structure according to the present exemplary embodiment, plurality of ribs 80 are integrally formed to the rear wall 46C of the garnish 46 so as to be interposed between the rear wall 46C and the pillar frame 42. A feature of the present exemplary embodiment is that a vehicle front-rear direction front end portion of an inclined portion 82 of each of the ribs 80 is formed in a convex face shape protruding toward the vehicle front side as viewed along the length direction of the front pillar 20.

As illustrated in FIG. 6, in a state prior to inflation and deployment of the airbag 38, the inclined portions 82 are disposed abutting the airbag module 36.

Operation and Effects of Present Exemplary Embodiment

Explanation follows regarding operation and effects of the present exemplary embodiment.

Although the shape of the inclined portion 82 of each of the ribs 80 is configured differently from in the first exemplary embodiment, the present exemplary embodiment basically builds on the configuration of the first exemplary embodiment, and so similar operation and effects are obtained.

Moreover, in the present exemplary embodiment, the vehicle front-rear direction front end portion of the inclined portion 82 of each of the ribs 80 is formed in a convex face shape bulging toward the vehicle front side as viewed along the length direction of the front pillar 20. Accordingly, load input to the garnish 46 from the airbag 38 is transmitted even more swiftly than, for example, in cases in which a vehicle front-rear direction front end portion of each of the inclined portions is formed in a linear shape. Moreover, the airbag 38 is suppressed from catching on the ribs 80, enabling the airbag 38 to be inflated and deployed as intended.

Third Exemplary Embodiment

Figure 7:
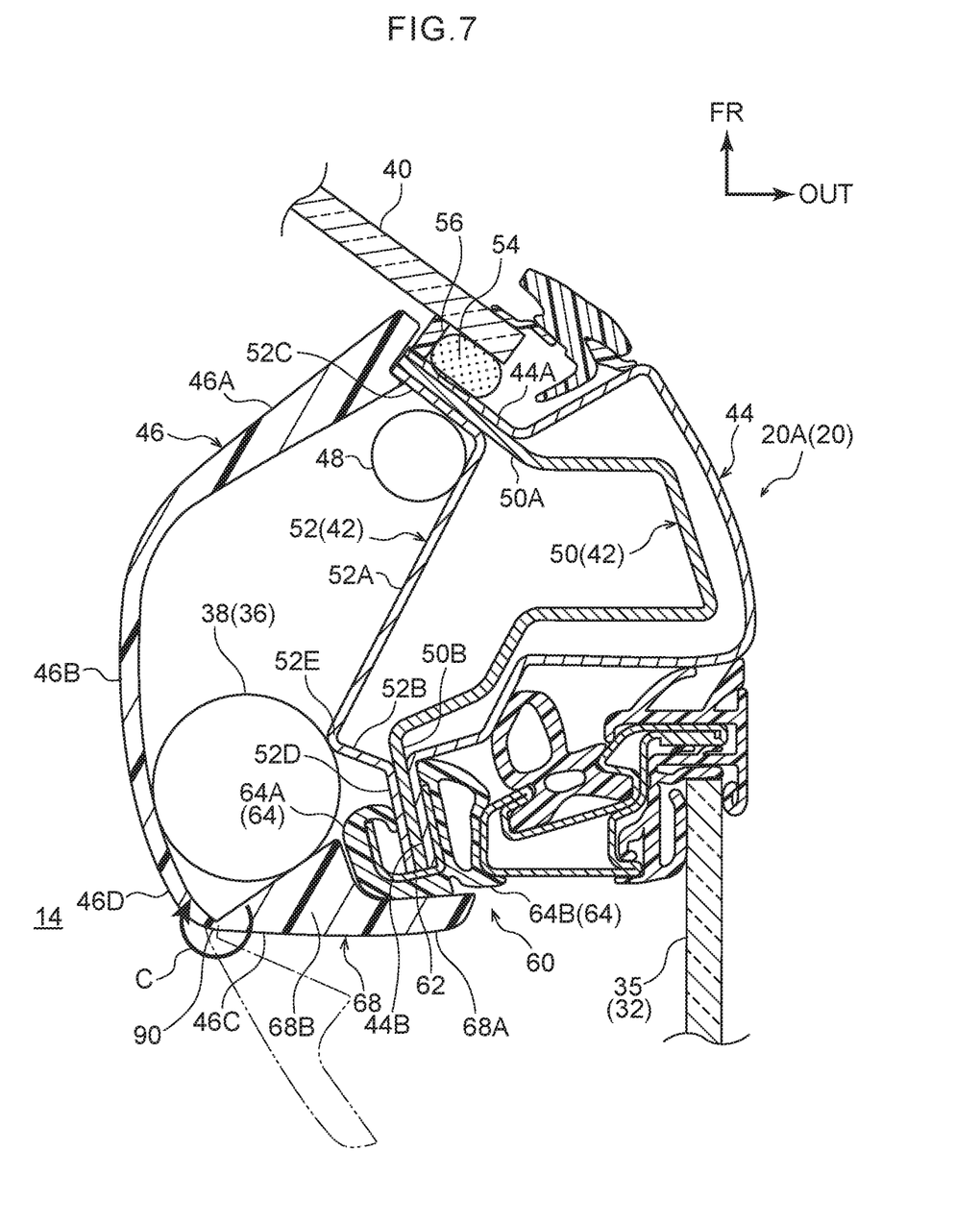
FIG. 7 is a cross-section corresponding to FIG. 1, illustrating a front pillar applied with a vehicle pillar structure according to a third exemplary embodiment.

Explanation follows regarding a vehicle pillar structure according to a third exemplary embodiment of the present disclosure, with reference to FIG. 7. Note that the same reference numerals are appended to members that are the same as those in the first exemplary embodiment, and explanation thereof is omitted.

As illustrated in FIG. 7, in the vehicle pillar structure according to the present exemplary embodiment, the plurality of ribs 68 are integrally formed to the rear wall 46C of the garnish 46 so as to be interposed between the rear wall 46C and the pillar frame 42. A feature of the present exemplary embodiment is that a thinned portion 90 is formed at a boundary portion between the garnish 46 and respective vehicle width direction inner end portions of the inclined portions 68B of the ribs 68.

The thinned portion 90 configures a part of the garnish 46 where a plate thickness direction thickness of the garnish 46 is set thinner than at other locations. As illustrated in FIG. 7, the thinned portion 90 of the present exemplary embodiment is formed at a face on the pillar frame 42 side of the garnish 46, and is configured by a groove formed in a substantially V shape in cross-section view of front pillar 20. The thinned portion 90 is formed in a linear shape running continuously along the length direction of the garnish 46. The linear thinned portion 90 is configured so as to pass along a boundary portion between the vehicle width direction inner end portions of the ribs 68 and the garnish 46. Thus, when a pushing force is applied to the rear end portion of the garnish 46 from the vehicle width direction outer side (the pillar frame 42 side), the rear end portion of the garnish 46 readily undergoes folding deformation (see the arrow C direction illustrated in FIG. 7) originating at the thinned portion 90. Thus, when airbag 38 inflates and deploys and the rear end portion of the garnish 46 bears pressing force from the airbag 38, the garnish 46 deforms from a normal shape illustrated by a solid line in FIG. 7 to a shape illustrated by a double-dotted dashed line in FIG. 7, and the rear end portion of the garnish 46 is more readily pushed apart toward the cabin 14 side.

Note that the thinned portion 90 may be formed in a discontinuous linear shape. Moreover, the thinned portion 90 may be configured as a substantially U-shaped groove in cross-section view of the front pillar 20.

Operation and Effects of Present Exemplary Embodiment

Explanation follows regarding operation and effects of the present exemplary embodiment.

Although configuration differs to that in the first exemplary embodiment in the respect that the thinned portion 90 is provided to the garnish 46, the present exemplary embodiment basically builds on the configuration of the first exemplary embodiment, and so similar operation and effects can be obtained.

Moreover, in the garnish 46 of the present exemplary embodiment, the thinned portion 90 where the plate thickness direction thickness of the garnish 46 is set thinner than at other locations is formed at the boundary portion between the vehicle width direction inner end portions of the inclined portions 68B and the garnish 46. Thus, during inflation and deployment of the airbag 38, the vehicle front-rear direction rear end portion of the garnish 46 undergoes folding deformation in a direction away from the pillar frame 42, originating at the thinned portion 90 under load input from the airbag 38. This suppresses any impairment to inflation, and deployment of the airbag 38 by the garnish 46, enabling the airbag 38 to be inflated and deployed as intended.

Supplementary Explanation of Above Exemplary Embodiments

In the first exemplary embodiment to the third exemplary embodiment, the number of the plurality of ribs 68, 80 integrally formed to the garnish 46 is greater in the length direction upper half region of the garnish 46 than in other regions (the lower half region). However, the present disclosure is not limited thereto. For example, a configuration may be applied in which the plurality of ribs 68, 80 are arrayed at substantially uniform spacings in the length direction of the front pillar 20. Alternatively, a configuration may be applied in which the ribs 68, 80 are only arrayed in a region of the garnish 46 matching the head protection region S.

In the first exemplary embodiment to the third exemplary embodiment, the vehicle front-rear direction front end portions of the inclined portions 68B, 82 configuring the ribs 68, 80 abut the airbag module 36 in a state prior to inflation and deployment of the airbag 38. However, the present disclosure is not limited thereto, and the inclined portions 68B, 82 and the airbag module 36 may be spaced apart from each other. In such cases, by disposing the airbag module 36 near to the vehicle front side of the ribs 68, 80, load input to the garnish 46 from the airbag 38 accompanying inflation and deployment of the airbag 38 is swiftly transmitted through the ribs 68, 80.

What is claimed is:
1. A vehicle pillar structure, comprising:
   a pillar frame that includes a flange portion configuring an attachment counterpart for a weather strip at a rear end portion, in a vehicle front-rear direction, of the pillar frame;
   a garnish that is attached to an inner side, in a vehicle width direction, of the pillar frame and that configures a styling face of a vehicle cabin interior; and
   a plurality of ribs that are integrally formed at a face of the garnish at a side of the pillar frame, that are supported by the flange portion via the weather strip, and that are arrayed along a pillar length direction, each of the plurality of ribs is provided with an inclined portion abutting an airbag module, the inclined portion having a front end, in the vehicle front-rear direction, formed in a convex face shape protruding toward the vehicle front side as viewed along the pillar length direction.
2. The vehicle pillar structure of claim 1, wherein an array density of the plurality of ribs on the garnish in the pillar length direction is higher in a predetermined height region of the garnish than in other regions of the garnish.
3. The vehicle pillar structure of claim 1, wherein an array density of the plurality of ribs on the garnish in the pillar length direction is higher in a length direction upper half region of the garnish than in a length direction lower half region of the garnish.

4. The vehicle pillar structure of claim 1, wherein, as viewed as a cross-section sectioned along a direction substantially perpendicular to a length direction of the pillar frame, the flange portion extends in a different direction from a direction of progress of a head of an occupant in an oblique collision.

5. The vehicle pillar structure of claim 1, wherein the airbag module includes an airbag configured to be inflated and deployed from between the vehicle front-rear direction rear end portion of the pillar frame and the garnish.

6. The vehicle pillar structure of claim 5, wherein a thinned portion, at which a plate thickness direction thickness of the garnish is thinner than at other locations, is formed at a boundary portion between an inner end portion, in a vehicle width direction, of the inclined portion and the garnish.

* * * * *